(No Model.)
A. P. CAMPTON.
Gate.
No. 242,597. Patented June 7, 1881.
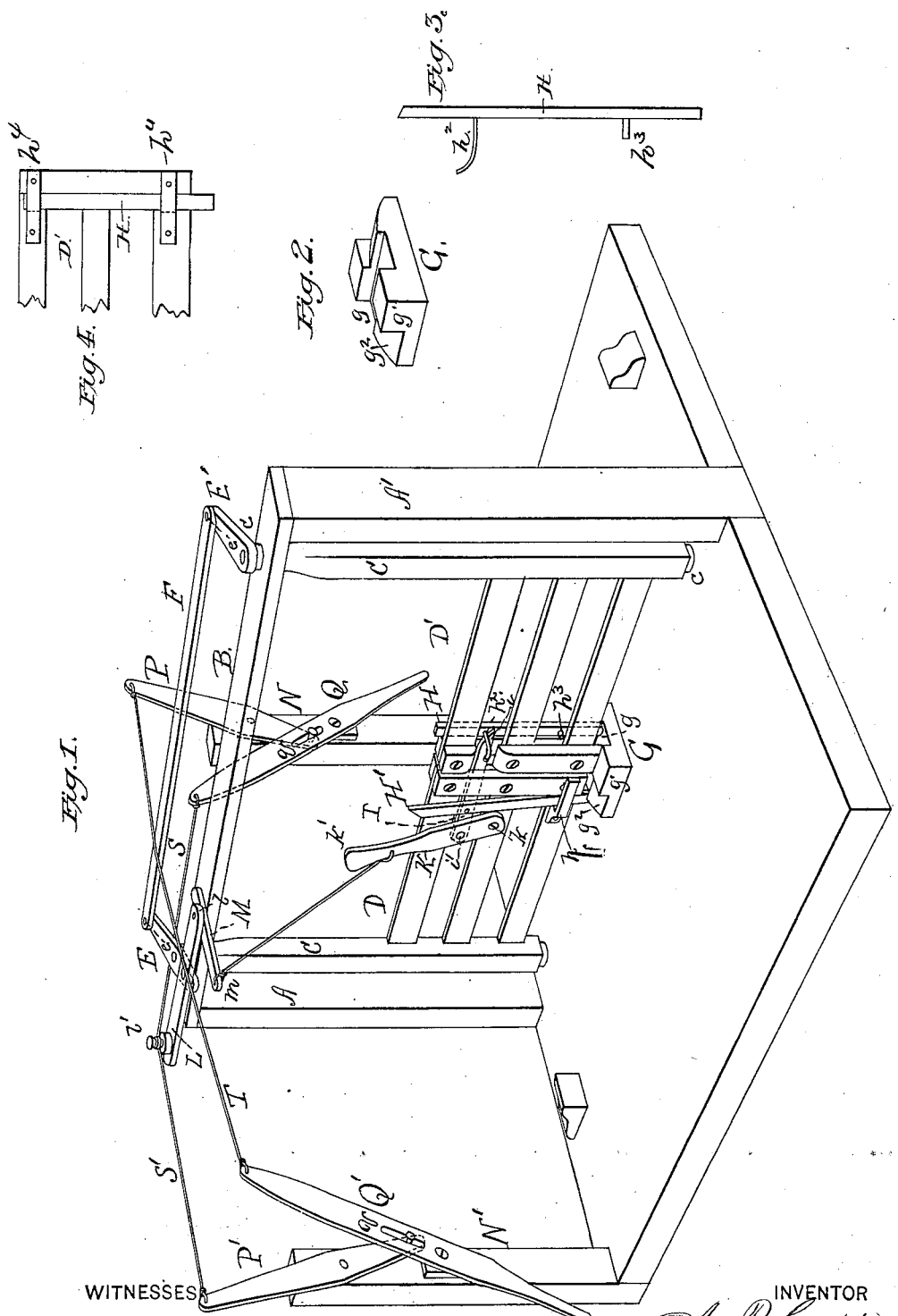
WITNESSES
John A. Ellis
Philip P. Masi
INVENTOR
A. P. Campton
by Anderson & Smith
his ATTORNEYS

UNITED STATES PATENT OFFICE.

ALFONZO P. CAMPTON, OF ROHNERVILLE, CALIFORNIA.

GATE.

SPECIFICATION forming part of Letters Patent No. 242,597, dated June 7, 1881.

Application filed April 2, 1881. (No model.)

*To all whom it may concern:*

Be it known that I, ALFONZO P. CAMPTON, a citizen of the United States, resident at Rohnerville, in the county of Humboldt and State of California, have invented certain new and useful Improvements in Gates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a perspective view of the gate. Fig. 2 is a detail view, showing the stop. Figs. 3 and 4 are details of the construction and application of the latch-rod H.

This invention relates to improvements in gates.

The invention consists in the construction hereinafter described.

In the annexed drawings, A A' represent posts, and B the top cross-bar of a gate.

C C' are the heel-posts of the gate-leaves D D', journaled in bearings $c$ $c'$, above and below. To the tops of these posts are rigidly secured the cranks E E', pivoted at $e$ $e$ to a connecting cross-bar, F.

G is a block placed on the ground where the inner edges of the gate-leaves meet. This block has a transverse groove, $g$, and the stop $g'$ and bevel $g^2$ on each end. At the ends of the leaves, but upon opposite sides, are the latch-rods H H', held in loops $h$ $h$, said latches being upon the side of the leaf away from the stops $g'$. One rod, H, has a finger, $h^2$, projecting therefrom to the other side of the leaf and curved upward, and a pin, $h^3$, near the bottom, said latch-rod H being held in place by guide-loops $h^4$. The other rod, H', is pivoted to a finger, I, which projects out from leaf D at $i$, and is pivoted at the rear $i'$ to a rod, K, in turn pivoted at its lower end, $k$, to leaf D.

To the top of crank E is secured a rod, L, carrying at its inner end, $l$, an arm, M. The two form a crank. From the end $m$ of arm M there runs a wire to the upper end, $k'$, of rod K.

To each side of post A is located a post, N N'. Pivoted to these posts are the levers P P' and Q Q', one above, the other below, the latter having slots $q$, in which work pins at the lower ends of the former. The upper end of lever Q, on post N, is connected by a wire, S, to the end $l'$ of rod L, and a wire, S', connects the same end to the upper end of the lever P', on post N. The ends of levers Q' and P are connected by a wire, T.

When the gate is closed the lower ends of rods H H are in groove $g$, behind the bevels $g^2$, and the bottom edges of the leaves D D' are held in said groove at their ends. In this position the end $i$ of finger I rests under the upcurved finger $h^2$.

By moving the lower end of either lever, Q' or Q, power transmitted through the wires and crank L M lifts the latch-rods and finger I, the latter acting on finger $h^2$, and then by a further pull the leaves open. By moving the lever in the opposite direction the gate is closed.

What I claim is—

1. Block G, having groove $g$ and stops $g'$ and bevels $g^2$, one stop and bevel on each side of groove $g$, in combination with the leaves of the gate, having the rod-latches, substantially as described.

2. Leaf D', having the rod H, with finger $h^2$, in combination with leaf D, having rod H', with finger I, substantially as described.

3. Levers P Q P' Q', wires S S' T, and posts N N', in combination with crank L M, leaves D and D', and the latch, substantially as described.

In testimony whereof I affix my signature in presence of two witnesses.

ALFONZO PIERCE CAMPTON.

Witnesses:
MORGAN CAMPTON,
T. DWIGHT FETT, Jr.